A. LARROWE.
Farm Gate.
No. 60,527.
Patented Dec. 18, 1866.
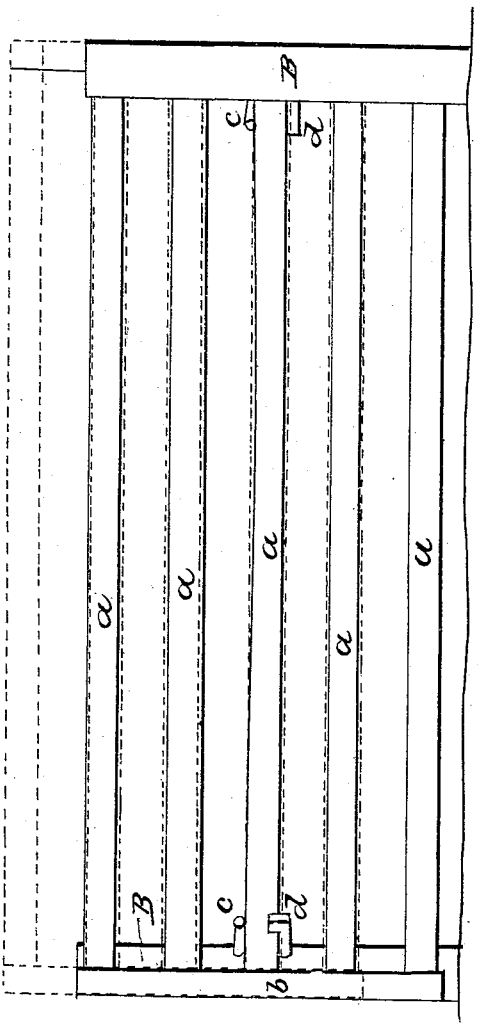
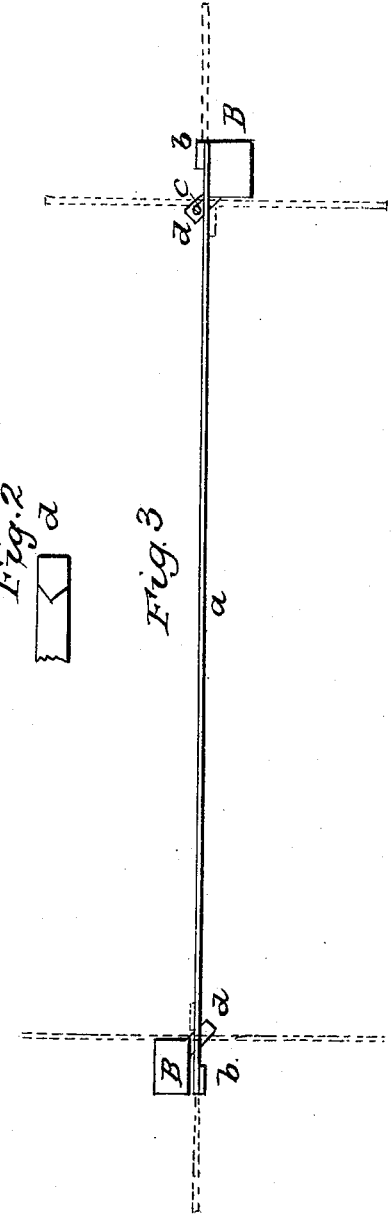
Witnesses
P. T. Dodge
T. T. Prosser
Inventor
A. Larrowe
By The Dodge atty.

United States Patent Office.

IMPROVEMENT IN FARM GATES.

A. LARROWE, OF COHOCTON, NEW YORK.

Letters Patent No. 60,527, dated December 18, 1866.

---

The Schedule referred to in these Letters Patent and making part of the same.

---

TO ALL WHOM IT MAY CONCERN:

Be it known that I, A. LARROWE, of Cohocton, in the county of Steuben, and State of New York, have invented certain new and useful Improvements in Farm Gates; and I do hereby declare that the following is a full, clear, and exact description thereof, reference being had to the accompanying drawings, making part of this specification, and to the letters of reference marked thereon—like letters indicating like parts wherever they occur. To enable others skilled in the art to construct and use the invention, I will proceed to describe it.

Figure 1 is a side elevation.

Figure 2, a top plan view of one of the hooks detached.

Figure 3, a top plan view.

My invention has for its object, the construction of a gate for ordinary farm use, in a very cheap and simple manner, and so as to dispense entirely with the usual metallic hinges and fastenings. I construct the gate of a series of narrow boards, a, ordinary fence boards answering for the purpose, and secure them together by nailing a strip b of the same across each end of the boards, as shown in fig. 1. The cross-bars b are nailed on opposite sides of the boards a, as shown in fig. 2, for the purpose of permitting the boards a to rest in close contact against the posts B B, as there shown, although this is not absolutely necessary. It will be observed that the boards are of uniform width, and the spaces between them are also uniform. Having thus constructed the gate, I then provide a hook d, which may be made of hickory or any tough kind of wood, and which I insert in the post B diagonally, as shown, the body of the hook standing at an angle of forty-five degrees with the surface of the boards a of the gate. The upper or projecting portion of the hook d has its inner faces bevelled, as shown, so as to be parallel with the face of the boards when inserted, as shown in figs. 2 and 3. One of these hooks is inserted in each of the posts B, on opposite sides thereof, as shown in fig. 3, and the gate is hung thereon, as shown. By locating the hooks about midway of the height of the posts, the gate, when hung thereon, will be held close against the posts, and neither top nor bottom of the gate can be shoved outward from the posts. In order to secure the gate in place, and prevent it from being lifted off the hooks by hogs or cattle, I bore a hole in the post B, and insert a peg c directly above the bar a, that rests on the hook d, the arrangement of the hook and peg being the same at each end, except that they are placed on opposite sides of the posts B B, as represented in the drawings. When thus constructed and arranged, it will be seen that by simply withdrawing the peg c, and lifting the gate off the hook d at one end, it can be shoved back on the other hook, as indicated by the red lines; and this may be done in either direction—to the right or to the left. Or, if preferred, the gate may be shoved about half way back, and then swung around at right angles to the fence, as indicated by the blue lines. It will also be seen, that when it is designed to separate small from large animals, as hogs or sheep from cattle or horses, the gate may be elevated by simply lifting it off the hooks, and raising it up, and letting the next lower bar rest on the hooks, as shown in red, in fig. 1.

Having thus described my invention, what I claim is—

The gate constructed as shown, and used in connection with the hooks d and pins c, all arranged to operate as herein shown and described.

A. LARROWE.

Witnesses:
W. C. DODGE,
T. P. PROSSER.